Nov. 13, 1934.  T. VON THIEN  1,980,604
METHOD AND APPARATUS FOR MAKING CARTONS
Filed Feb. 18, 1933   7 Sheets-Sheet 2

INVENTOR-
Theodore Von Thien
BY Harold D. Penney
ATTORNEY-

Nov. 13, 1934.  T. VON THIEN  1,980,604

METHOD AND APPARATUS FOR MAKING CARTONS

Filed Feb. 18, 1933  7 Sheets-Sheet 6

INVENTOR-
Theodore Von Thien
BY
Harold D. Penney
ATTORNEY-

Patented Nov. 13, 1934

1,980,604

UNITED STATES PATENT OFFICE 1,980,604

METHOD AND APPARATUS FOR MAKING CARTONS

Theodore Von Thien, Nyack, N. Y., assignor to Robert Gair Company, Inc., New York, N. Y., a corporation of Delaware Application February 18, 1933, Serial No. 657,365

30 Claims. (Cl. 93—49)

This invention relates to card board boxes and more particularly to flat folded boxes and blanks, methods and machines for making said boxes, and particularly to mechanism for folding certain elements of the blanks as the blank travels through the machine. However it is noted that in some of the claims the invention is not limited to flat folded boxes, nor machines nor to machine methods.

One object of the invention is to provide a novel flat folded box which may be easily shipped in quantity while folded flat, and may be quickly erected for use.

Another object of the invention is to provide a prescored blank for making such blanks, and an efficient method for making the flatfolded boxes, whereby the box is directly completed flat folded without any intermediate erected form.

Another object of the invention is to provide an improved mechanism for completing certain steps of the method of making this box or for making boxes having similar folded members.

Other objects of the invention are to improve generally the simplicity, economy and efficiency of such blanks, boxes, methods and machines and to provide boxes and mechanisms of this kind which are economical, durable and reliable in use, and economical to manufacture or install.

Still other objects of the invention will appear as the description proceeds; and while herein details of the invention are described in the specification and some of the claims, the invention is not limited to these, since many and various changes may be made without departing from the scope of the invention as claimed in the broader claims.

The inventive features for the accomplishment of these and other objects are shown herein in connection with the improved blank, folding method and mechanism, and the resulting box in flat folded or erected form hereinafter described.

Briefly stated, the card board blank is cut and scored to provide a bottom, inner end-wall members at the ends of the bottom, side walls at the sides of the bottom, each having outer-end-wall-forming end-extensions, extensions of one side wall being longer than and joinable to the other extensions to form outer end walls. Said blank has a central axial score line through said bottom and inner end-wall members, the longer of said end extensions being scored to provide bisecting fold lines for the outer end-walls formed thereby.

Said method comprises folding said inner end-wall members to superpose them upon bottom, then folding the thus folded blank along said central score to superpose the shorter extensions upon the inner margin of the longer extensions, and then folding said longer extensions at the bisecting score to superpose and adhere them to the shorter extension, thereby directly forming a flat folded box.

Briefly stated, the flat-folded box thus formed comprises, a bottom, inner end-wall members folded inwardly at the ends of said bottom, the thus folded blank being folded along the axial score, with the inner end walls between the bottom members. The side walls are superposed in the plane of the bottom, and the ends of the outer end walls join adjacent ends of the side walls and are folded outwardly in the planes of the side walls and bottom.

To erect the flat folded box for filling, the operator unfolds the folded bottom inner end-wall members and outer end-walls and at the same time simultaneously automatically unfolds and erects the end-wall members and the side walls, and then erects the inner-wall members to form the inner end wall.

The collapsible box thus formed comprises upstanding inner end-walls which may be folded to lie on the bottom, after which the bottom may be folded on the axial score, thus at the same time superposing the upstanding side walls, and simultaneously outwardly folding said outer end-walls along the bisecting score line extending from top to bottom thereof.

When performing the method mentioned above by machine it is desirable that the inner-end-wall forming members travel through the machine at the advance and following end of the blank, and all of the method except the initial folding of these members may be thus accomplished on well known machines similar to the machines shown in Patents Nos. 1,104,013; 1,123,945; 1,144,506; 1,324,474; 1,580,342, and 1,671,688, issued to E. G. Staude.

As indicated above, the inner-end-wall forming members, are initially folded on the mechanism shown herein.

Briefly stated, the mechanism for folding the end wall members as the blank advances through machine includes mechanism for horizontally conveying in a horizontal plane, a blank having foldable end wall members at the advance and following edges of the blank. A folder-carrier movable with and under said blank carries advance and following folding dogs movably mounted on said carrier respectively under said members; and as the dogs move they engage a cam bar to raise said dogs thereby to raise said members. Said following dog has a forwardly projected finger adapted, as the dog rises to fold the rear member forwardly over the blank almost in contact with the blank body. Afterwards a stationary cammed holding bar above the blank serves to lower the end wall members as the blank moves on to other parts of the machine.

While in this specification and claims mention is made of materials and of the bottom, top ends, front and rear of the boxes, blanks and other devices and it is stated that one part is moved toward the other rather than vice versa and that parts are foldably joined, it is understood that these words are used for designation and description and that for purposes of protection they are to be construed broadly enough to cover boxes and blanks which are broader than they are long, and other relative arrangements, dimensions or positions than as shown, and when parts are connected by other than score lines, and in general all terms of the claims are to be given as broad an interpretation as possible, when the protection is thereby enhanced.

In the accompanying drawings showing, by way of example, one of many possible embodiments of the invention.

Figures 10, 11, 12, 13:
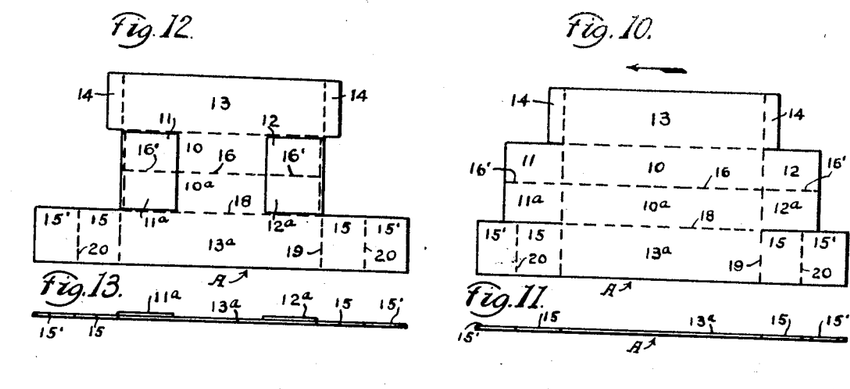
Fig. 10 is a plan or face view showing the card board blank.
Fig. 11 is an edge view of the blank.
Figs. 12, 14 and 16 are plans showing the folded blank in various stages of fold, Fig. 16 showing the completed flat folded box.
Figs. 13, 15 and 17 are edge elevations of the blanks as in Figs. 12, 14 and 16 respectively.

For carrying out this method, one may use a flat, one-piece card board blank A cut and scored to provide all rectangular members including the box bottom 10, 10a, inner end-wall members 11, 11a and 12, 12a extending from the respective ends of the bottom, and side walls 13, 13a extending from the respective sides of the bottom, one side wall having short-glue-receiving securing end wall extensions 14, the other side wall having outer end-wall-forming extensions 15, 15' at the ends for forming outer end-walls adapted to be secured to said end-extensions 14.

Said blank A has a central axial score 16, 16' extending longitudinally through said bottom and inner end-wall extensions, scores 18 at the sides of the bottom, transverse scores 19 forming wall-corners and bottom ends, and bisecting scores 20 parallel to the transverse scores 19 and bisecting the outer end-walls.

Said method may be performed by hand or machine. The first steps may be performed by hand or machine. The first steps may be performed on the machine of Figs. 1 to 9 as will be later described in detail; and the initial part of the machine mentioned consists in mechanisms for successively feeding said blanks one at a time constantly horizontally in a straight path alined with said axial score 16, 16', and then successively folding the advance and following inner end-wall members 11, 11a, and 12, 12a at the transverse scores 19 as the blank advances and superposing these members upon the top face of said bottom, as in Fig. 12, while holding and guiding the side edges of the blank.

Figures 14, 15:
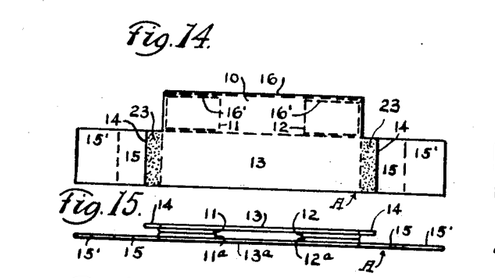

The remainder of the method may be performed on well known machines and consists in holding horizontal the side wall 13a, extensions 15, 15' and the adjacent portion 10a of the bottom while the blank is still traveling in the same direction in said path and folding the thus folded blank (Fig. 12) along said central score 16, 16' to superpose the fastening extensions 14 upon the corner margins of the outer end walls respectively adjacent to the scores 19, as in Fig. 14 and while still maintaining said central score 16, 16' moving in alinement with said path.

Adhesive 23 may be applied to the exposed faces of the thus superposed extensions 14 while maintaining the blank horizontal in said first path, or may be applied after moving the blank in a new path at a right angle to the first path, with the central score 16, 16' transverse to the new path, as is usual on machines in this art. Then, while the blank is still moving in the new path, said end-walls are folded at the bisecting score 20 to superpose and adhere the free margins of the end wall sections 15' to said extensions 14, thereby to form a flat folded box as in Figs. 16 and 17.

The method performed by hand is the same as the above, except the blank does not travel. By hand said method comprises merely folding said inner end-wall members 11, 11a and 12, 12a on said bottom 10, 10a, folding the thus folded blank along the line 16, 16' to superpose the side walls upon each other, applying the adhesive 23, and then folding each extension 15, 15' to superpose the free margin of the section 15' upon the adhesive on the extension 14.

Figure 16:
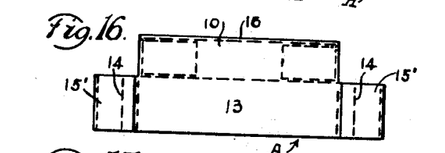
Figures 17, 18:
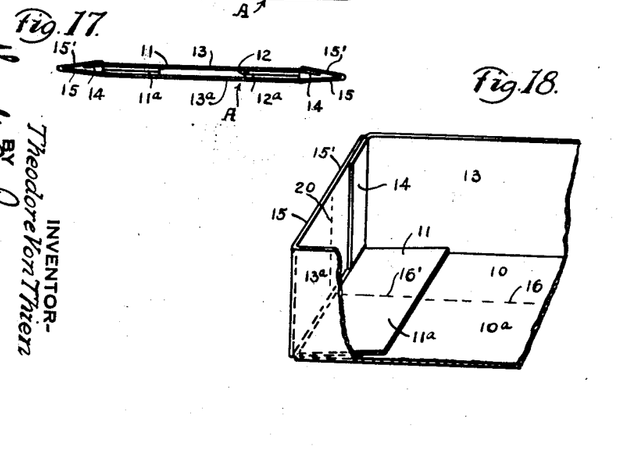
Fig. 18 is a fragmental perspective view showing one end of the box all erected except the inner end wall member which is shown lying flat on the box bottom.

As shown in Figs. 16 and 17, the flat-folded box inner end-wall members 11, 11a and 12, 12a are folded inwardly flat upon said bottom, the thus folded blank being folded along the central axial score 16, 16' with the inner end-walls disposed between the bottom sections 10, 10a, the outer end-walls being folded outwardly and creased at the bisecting score 20 and lying flat upon each other.

To erect the flat folded box it is only necessary to simultaneously unfold the folded bottom sections 10, 10a and the inner end-wall members 11, 11a and 12, 12a and outer end-walls. This automatically erects said end walls and the side walls, as in Fig. 18, the members 11, 11a and 12, 12a still lying on the bottom. Then the inner-wall members are erected to form the box of Fig. 19.

Figure 19:
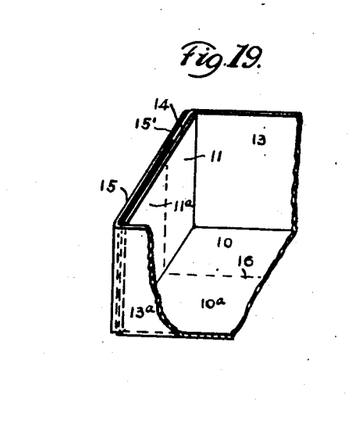
Fig. 19 is a fragmental perspective view showing an end of the completely erected box.

The box as in Fig. 19 may be easily collapsed to the flat folded condition of Fig. 17, said inner end-walls 11, 11a and 12, 12a being foldable inwardly to be superposed flat upon said bottom as in Fig. 18, the crease 16, 16' then tending to fold downwardly, and the bisecting crease of the inner end wall tending to fold inwardly, whereby when they are superposed upon the bottom, the bottom and superposed inner end walls tend to fold as in Figs. 16 and 17. Said outer end-walls 15, 15' are creased and tend to fold intermediately outwardly at a bisecting score, whereby when said bottom, with the inner end-walls superposed thereon folds downwardly, the outer end walls fold outwardly to form a flat folded box of Figs. 16 and 17.

The folding mechanism

Figure 21:
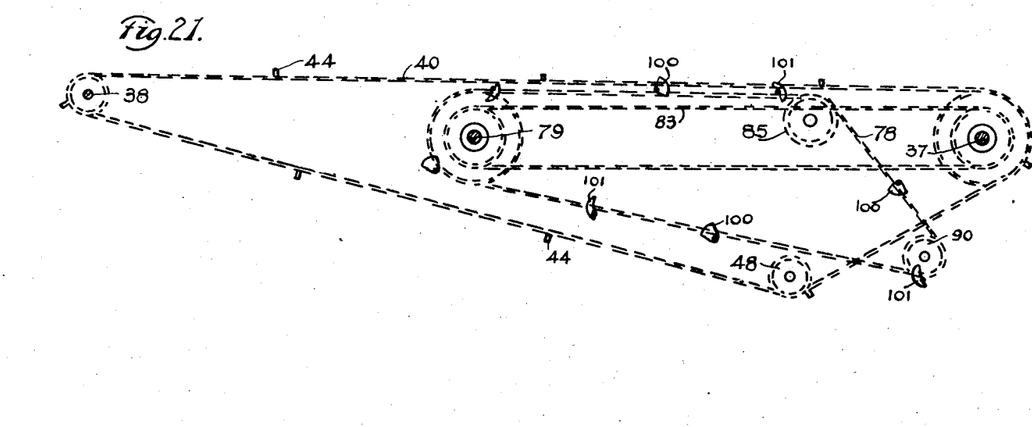
Fig. 21 is a diagrammatic side elevation showing the chains, dogs, sprockets and sprocket shafts.

As stated before, the later steps of the method may be performed on well known machines, but to mechanically perform the method as a whole, the new means for initially folding the end wall members 11, 11a and 12, 12a are necessary. Such mechanism is here shown in combination with a folding machine which very briefly stated includes a mechanism 32, 33, 40 (Fig. 1) 44, (Fig. 21) for successively feeding and conveying, in a horizontal plane, blanks 45 (Fig. 7) as in Fig. 10 having foldable members 46, 47 (corresponding to the members 11, 11a and 12, 12a) at the advance and following edges. A folder-carrying chain 78 having its upper course disposed under said blank and driven substantially at the same speed carries advance and following folding dogs 100, 101 pivotally mounted on said chain 78, respectively near the front and rear of the blank, and adapted to engage on a cam bar 105 as the chain and blank travel, said forward dog 100 being shaped and disposed to raise said forward member 47 as in Fig. 7 when the dog mounts said cam bar.

Said rear dog 101 has a forwardly projected finger 120 adapted, as the dog mounts the cam bar, to fold the rear member 47 over the blank. The blank then moves under a holding bar 130 disposed above the path of the blank which holding bar serves to engage and hold down the folded members as the thus folded blank is delivered to rolls 134, 135 (Fig. 1) and then to other parts of the machine for completing the method as above described.

Figure 1:
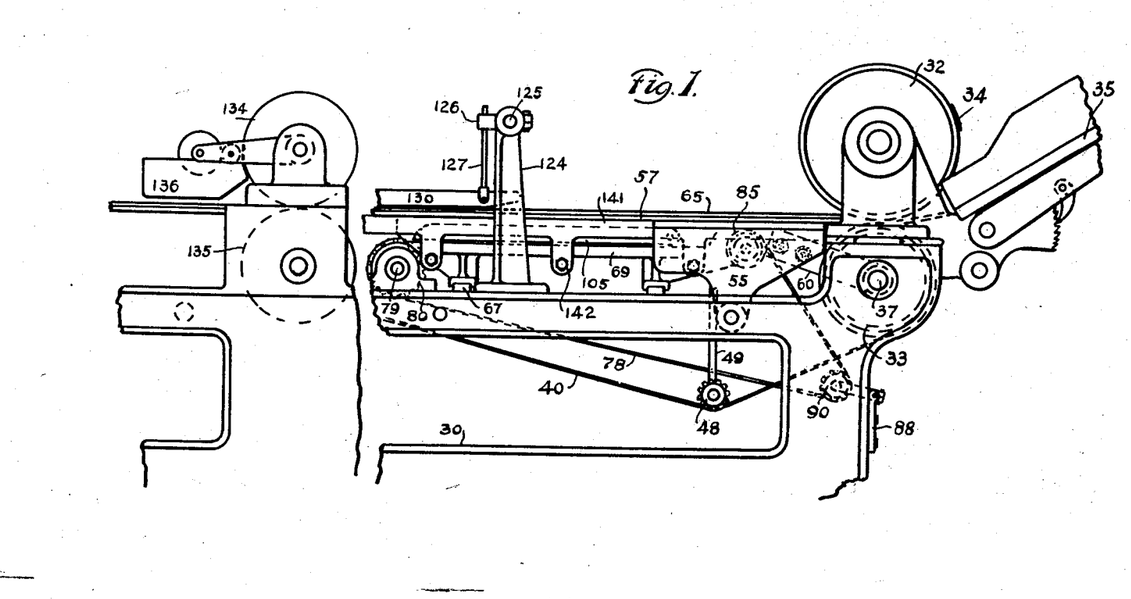
Fig. 1 is a fragmental side elevation showing part of a machine provided with the folding dogs and blank feeding and conveying mechanism.
Figure 20:
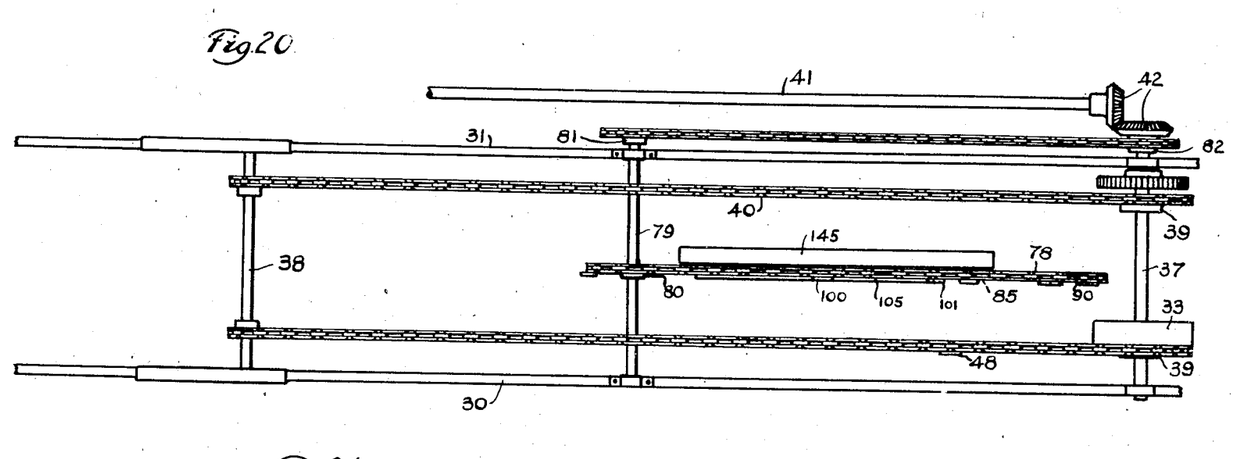
Fig. 20 is a fragmental plan showing the blank drive chains, folder chains, drive means therefor and associated parts.

Further details of the folding machine will now be described. These are carried on a frame comprising frame side members 30, 31 (Figs. 1 and 20).

Blank feeding mechanism

Suitably driven superposed feed rolls 32, 33 (Figs. 1 and 2) are mounted across the receiving end of the frame, the upper roll 32 carrying a rubber feed plug 34 for feeding blanks one at a time.

A supporting plate 35 serves for holding a stack of blanks, the plate being adjustably inclined to direct the blanks to the rolls, to be fed one at a time from the rolls with the inner end-wall members 11, 11a and 12, 12a, which are to be folded, at the advance and following edges respectively of the blank. This feed means is well known and need not be further described.

Blank conveying mechanism

Mechanism for conveying said blanks includes a chain conveyor comprising transverse drive and driven sprocket-shafts 37, 38 (Fig. 20) rotatably mounted in the frame members near and remote respectively from said feed rolls, and carrying sprockets 39 fast thereon on which are disposed parallel feed chains 40 having horizontal upper courses at a level to receive blanks fed from the feed rolls. Drive means for said drive shaft 37 includes a longitudinal power shaft 41 driven by a suitable source of power and intermeshing miter gears 42 fast on the power shaft and drive shaft respectively.

Drive lugs 44 (Figs. 4 and 21) carried on said chains are positioned thereon to engage the rear edge of each blank, (as shown by the dotted lines 45) as it is fed from the rolls, to drive the blank with its longitudinal axis, such as said center score alined with its path of movement.

In Figs. 2 to 4 and 7 to 10, there is shown a blank 45, with advance and following foldable members 46, 47 corresponding to the end wall members 11, 11a and 12, 12a of the blank A, it being understood that this mechanism is adapted for folding other similar blanks 45 having foldable members 46, 47.

Idlers 48 (Figs. 1 and 2) are adjustably mounted on a bracket 49 to hold the lower courses of the chains taut, and permit the chains and lugs to be adjusted for different blanks.

Conveyor adjusting mechanism

Transverse rotary supporting guide rods 50, 51 (Figs. 3 and 4), mounted on the frames and provided with right and left threads 52, and with sprockets 53 fast thereon connected by a chain 54 for constraining the rods to rotate in unison, carry upright supporting brackets 55 having threaded bores received on said threads. Longitudinal chain race bars 57 are mounted on said brackets and have upwardly open races 58 to receive and support the upper courses of the feed chains. Forked extensions 60 (Fig. 1) carried by said brackets respectively engage in peripheral grooves 61 (Fig. 3) in hubs 62 of said sprockets 39, whereby on the rotation of a crank receiving means 63 on an end of the rod 51, the rods may be rotated to simultaneously move the races, extensions, hubs, sprockets and chains inwardly or outwardly to accommodate blanks of different sizes. Undercut guide bars 65 on the outer edge of the race bars serve to guide the side margins of the blanks and hold the blank from rising as the blank travels.

The end-wall folding mechanism

The inner-end-wall member folding mechanism includes transverse supporting bars 67 (Figs. 2 to 4) disposed across said frame intermediately of the ends of the feed chains and having elongated slots 68 longitudinal to the bar and extending vertically through the bar. A longitudinal transversely adjustable supporting frame 69 has feet 70 having transverse bottom grooves received on said bars; and bolts 71 passing through said feet and slots adjustably clamp the frame in place.

Said frame 69 comprises a vertical web 73 (Fig. 4) extending to near the passing blank, and a lateral horizontal web 74 supporting a grooved bar 75 secured by bolts 76 along said lateral web parallel to the vertical web and provided in its top face with a chain race groove 77 to receive the upper course of a folder-carrying chain 78.

Folder chain drive means

A drive shaft 79 (Figs. 1 and 20) mounted across said frames forward of the discharge end of the race groove 77 carries a drive sprocket 80 having its upper part tangential to said groove 77. Drive means for said drive shaft 79 includes a sprocket 81 (Fig. 20) thereon, a sprocket 82 on said sprocket-drive-shaft 37 and a chain 83 carried on said last named sprockets, whereby the shaft 79 is driven from the shaft 37.

An axially transverse guide sprocket wheel 85 (Fig. 2) mounted on the receiving end of the supporting frame 69 with its uppermost part tangential to said race groove and said sprocket 80, receives the folder-carrying chain 78, which is disposed over said drive and guide sprockets and has its upper course disposed in said race groove, under and near the passing blank. A cross bar 87 (Fig. 2) on said frame members below the feed rolls carries an idler bracket 88 carrying a rod 89 on which is adjustably mounted an idler 90 under which the folder carrying chain 78 passes whereby the lower course of said chain may be held taut.

The folding dogs

Certain links of said folder-carrying chain 78 are formed with outwardly disposed lug blocks 93 (Figs. 4 to 6), each having a transverse threaded bore 94 and a rearward projection 95, said blocks being disposed, relative to said lugs 44 of the conveyor chains, in position to lie just to the rear of the rear edge of the body of the blank as at 45, and somewhat in advance of the advance edge of said body.

Figure 7:
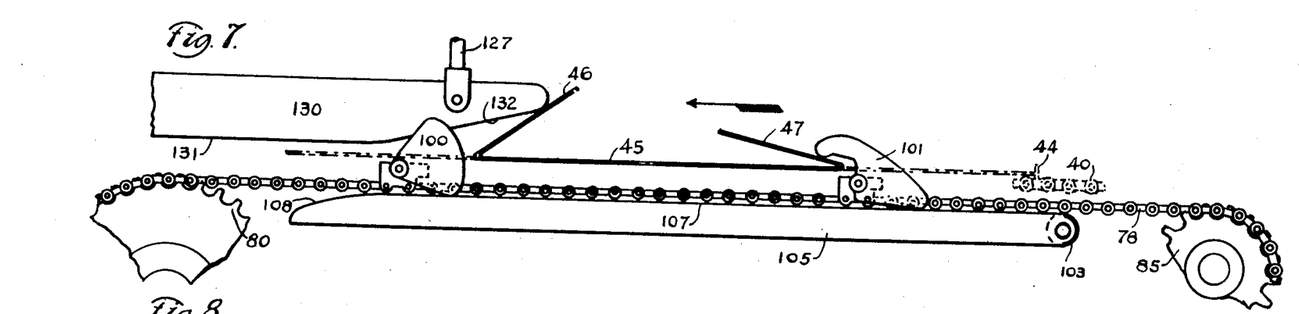
Figs. 7 to 9 are fragmental side elevations showing different positions of the dogs and the blank members folded thereby.

Pivot pins having an outer head 97, an intermediate smooth bearing portion 98 and an inner threaded end 99 engaged in said bore 94, carry forward and following folding dogs 100, 101 (Figs. 2 and 5) pivotally mounted on said bearing portion 98 of said pins respectively, and each having a downwardly and rearwardly disposed lower cam face 102 adapted to be engaged by a roller 103 forming a rear cammed end of a cam bar 105 (Fig. 4) secured by bolts 106 to the outer side face of said grooved bar 75 and extending longitudinally a distance greater than the length of the blank 45 and having a top engagement face 107 having a downwardly cammed discharge end 108 (Fig. 7). The receiving end of the cam bar is bifurcated as at 109 (Fig. 5) and carries an axially transverse shaft 110, on which the roller 103 is mounted between the bifurcations, thereby forming an antifriction rear cammed end for the cam bar which the dogs engage as the folder carrying chain moves forwardly, thereby to pivotally move the dog upwardly and forwardly. A spiral torque-spring 114 (Fig. 6) disposed around each pivot pin has its ends secured to the head 97 and the adjacent dog respectively, the spring being disposed and tensioned to cause the dog to yieldably engage the cam bar and return the dog to the lower position when disengaged from the bar. Each dog has an arcuate slot 115 (Fig. 5) concentric with the pivot pin in which is disposed a limiting pin 116 mounted in the rear extension 95 of each lug block to limit the pivotal movement of the dog.

The forward dog

Figure 2:
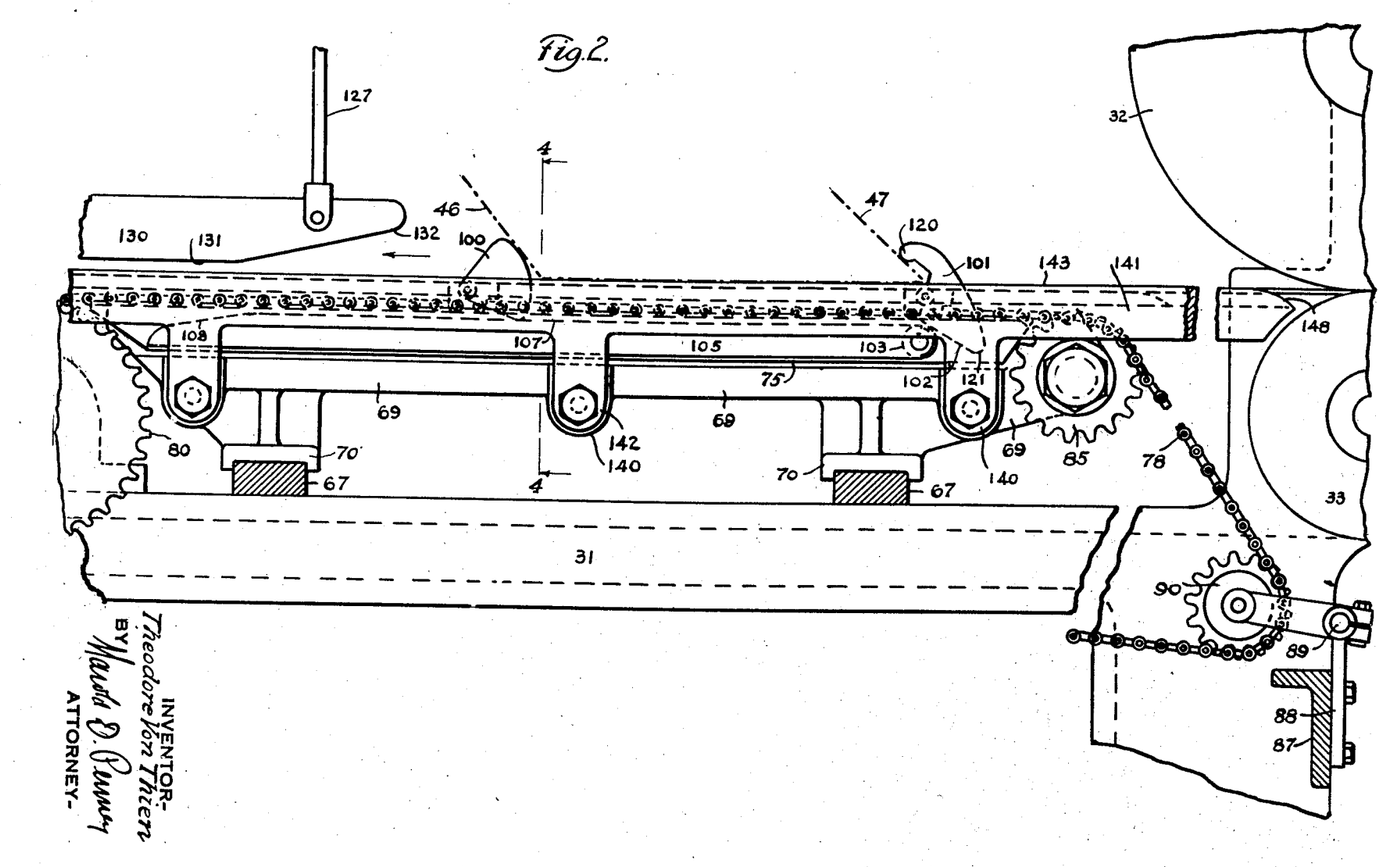
Fig. 2 is a fragmental side elevation showing the dogs and associated mechanism on a larger scale.
Figure 3:
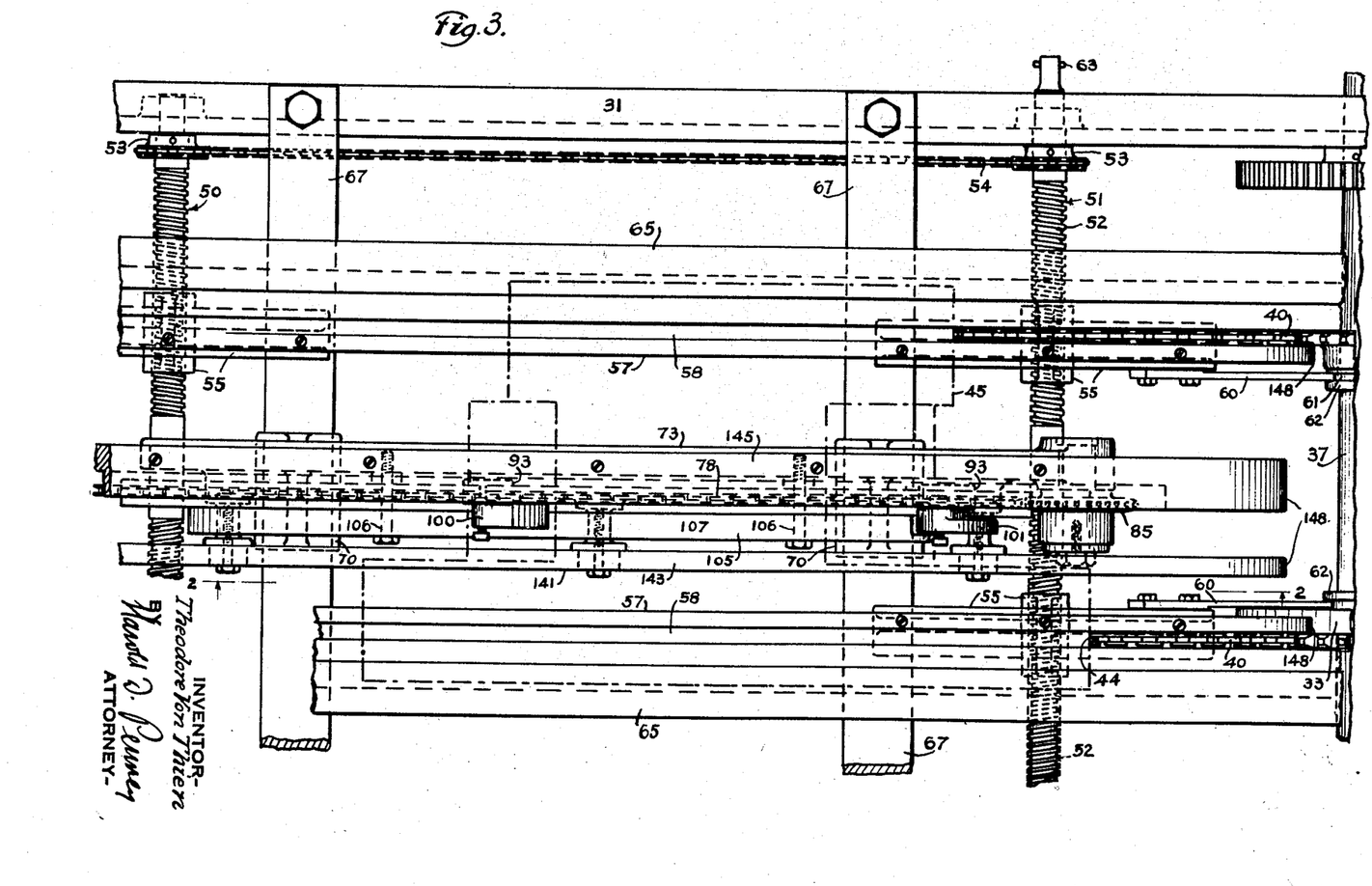
Fig. 3 is a fragmental plan showing the structure of Fig. 2.

Said advance or forward dog 110 is of sector shape with the pivot pin at the apex, and has a rounded upper corner 118, the dog being so disposed and dimensioned that when said lower cam face 102 mounts said rear cammed end 103, said rounded upper corner 118 engages under the inner margin of the forward member 46 of the blank and inclines it upwardly as in Fig. 2, and holds it thus inclined upwardly and forwardly as the dog travels on the top face 107 of the cam bar.

The rear dog

Figure 8:
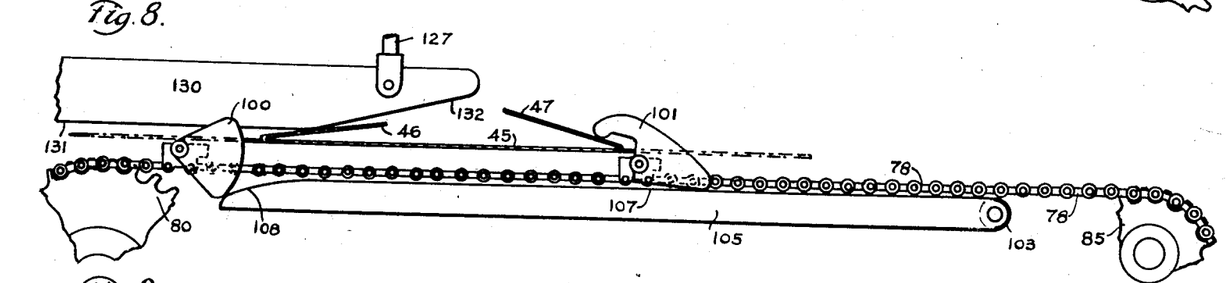

The following or rear dog 101 (Figs. 2 and 7 to 9) is of approximate sector shape with the apex near the pivot pin, and has the upper rear corner formed with an upwardly and forwardly projecting finger 120 adapted, as the lower cam face 102 mounts the cam bar, to engage an intermediate part of the rear member 47, said finger 120 being sufficiently forwardly disposed relatively to the lower rounded corner 121 (Fig. 2) to fold said rear end-wall member almost flat against the box bottom 10, 10a of the blank, as shown in Figs. 7 and 8.

The holding bar

Figures 4, 5:
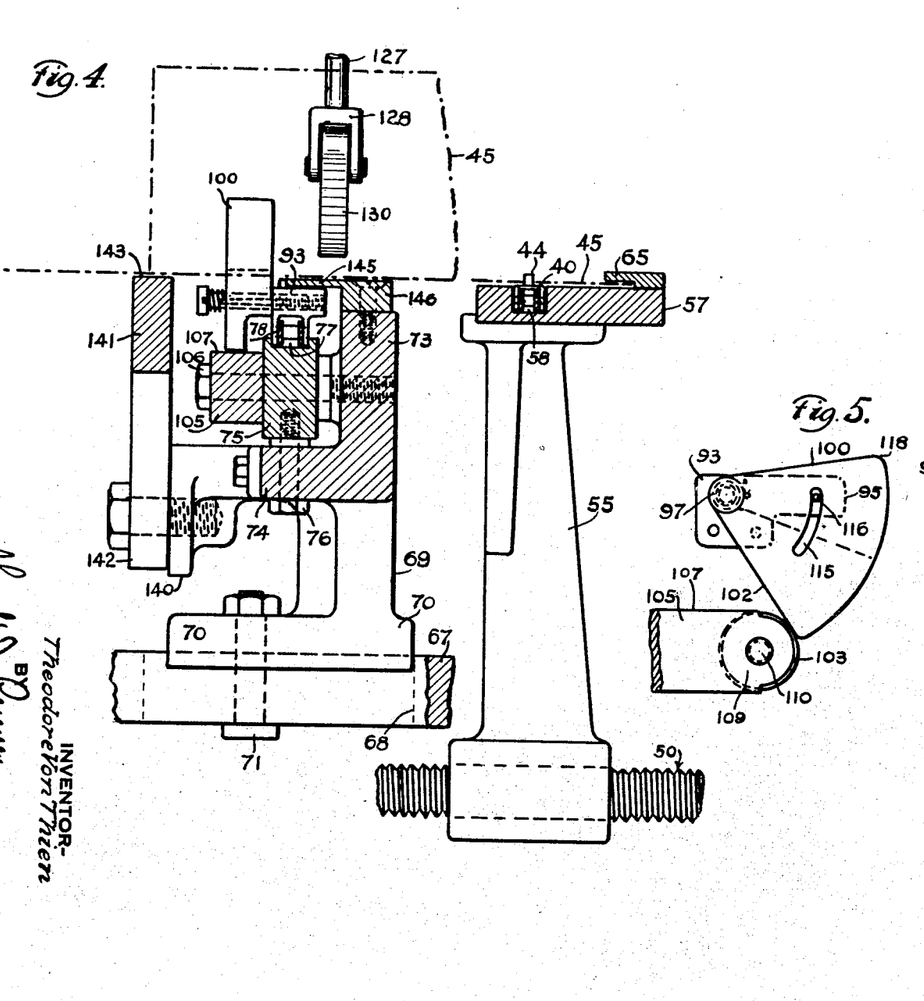
Fig. 4 is a transverse sectional view, partly in elevation, taken through the folding mechanism.
Fig. 5 is a fragmental side elevation showing the forward dog and associated parts.
Figure 6:
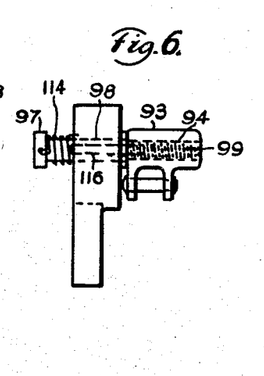
Fig. 6 is an end or edge elevation showing the forward dog.

A standard 124 (Fig. 1) on one side frame of the machine carries a transverse rod 125 carrying a radial block 126 clamped on said rod in which is mounted a pending rod 127 having a downwardly forked end 128 (Fig. 4).

Figure 9:
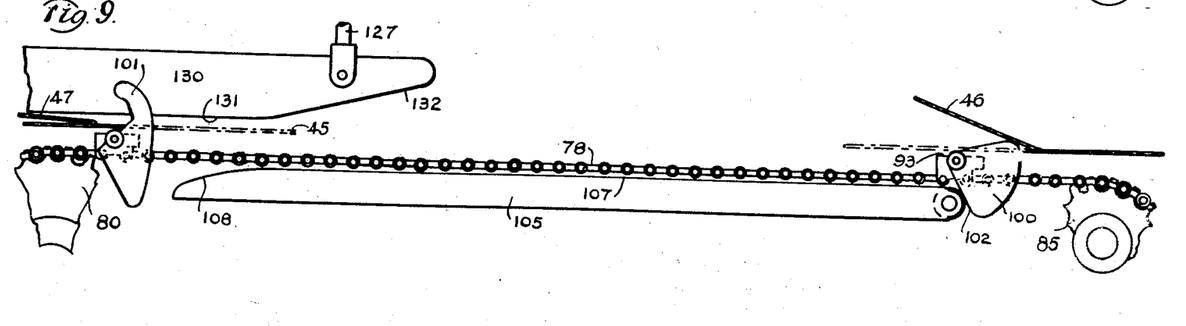

A holding bar 130 is mounted between the prongs of said fork end of said pending rod and of another similarly supported rod, and is disposed longitudinally above the path of the blank 45 and offset from and parallel to the path of said dogs, said holding bar 130 having a lower engagement face 131 upwardly cammed at the rear end 132 and adapted to engage and force down the members 46, 47 as the blank passes on as in Fig. 9 to a pair of superposed gluing or ironing rolls 134, 135 (Fig. 1) at the discharge end of said holding bar, adapted to receive the blanks with the partially folded wall members and flatten them against the box bottom of the blank.

Blank supporting means

Brackets 140 (Fig. 4) extending outwardly from said horizontal web 74 carry a track bar 141 having lower projections 142 secured to said brackets. Said bar has an upper track face 143 engageable under the blanks. A longitudinal track plate 146 is mounted on the top face of said vertical web 73 and has an overhanging part 145 disposed over said lug blocks for holding the chain 78 in place and cooperating with said track bar 146 and race bars 57 to form a slide support for the traveling blank. Said track bar 141, plate 145, 146 and grooved bars 57 have downwardly cammed receiving ends 148 (Fig. 3) to facilitate the reception of the blanks.

The rolls 134, 135 are shown in Fig. 1 as gluing rolls instead of simple ironing rolls, but are intended to represent rolls which may flatten the foldable members 46, 47 against the blank body. They are here shown as gluing rolls associated with a well known glue pot 136. The part of the machine carrying the glue pot is broken from the part carrying the folding dogs, to indicate that the glue pot may be at a remote part of the machine.

Operation of the folding mechanism

The operation will be obvious from the foregoing, and need now be only briefly summarized as follows:

The blanks 45, with the members 46 disposed forwardly are fed one-by-one, from the feed rolls 32, 33, upon the trackways 57, 143, 145 (Fig. 4) just forward of the lugs 44, whereupon the lugs 44 come forward and engage the rear edge of the blank and carry the blank forwardly with the members 46, 47, disposed over the dogs 100, 101 respectively. During the forward movement of the blank and folding by the dogs 100, 102, the 1 blank is guided and held from rising bodily by the under cut guide bars 65.

Operation of the forward dog

The blank and dogs move forwardly and the forward dog 100 mounts the cam bar, raising the advance member 46 to the angle shown in Fig. 2.

When the lower face 102 of the rear dog reaches the cam bar, it mounts the cam bar; and the finger 120 pivots forwardly as in Fig. 7, moving the rear member 47 almost to the blank body.

The blank continues to move forwardly with the forward member 46 at the angle of Fig. 2 until the member strikes the rear end 132 of the holding bar and is bent back first to the position of Fig. 7, and then to the position of Fig. 8 under the holding bar.

Operation of the rear dog

While the forward dog is thus operating, the rear dog engages the cam bar and pushes the rear member 47 first to the position of Fig. 2 and then to the position of Figs. 7 and 8, low enough to move its forward free edge entirely under the end 132, then to be lowered to the blank body as at the left of Fig. 9.

The lowered members 46, 47 then move to flattening means such as the rolls 134, 135 (Fig. 1), after which they move to other parts of the machine as hereinbefore explained.

I claim as my invention:

1. A method of forming a box from a blank comprising a box bottom, inner end-wall members at the ends of the bottom, side walls at the sides of the bottom, each having outer-end-wall-forming end-extensions one longer than the other; the blank having a central score through said bottom and inner end-wall members, the longer of said end extensions each having a score from top to bottom, said method comprising folding said inner end-wall members on said bottom; folding the thus folded blank along said central score with said members inward to superpose the side walls and superpose said extensions; applying adhesive to the exposed faces of the thus superposed shorter end extensions; folding each longer extension at its score to superpose the free margin of the longer upon the free margin of the shorter extension; and securing the superposed margins together.

2. A method of forming a box from a blank comprising a box bottom, inner end-wall members at the ends of the bottom, side walls at the sides of the bottom, each having outer-end-wall-forming end-extensions one longer than the other; said method comprising folding said inner end-wall members on said bottom; folding the thus folded blank along a central longitudinal line to superpose the side walls upon each other; applying adhesive to the exposed free margin of the shorter end-extension; and folding each longer extension to superpose and press the free margin of the longer upon the free margin of the shorter extension, thereby securing the superposed margins together, thereby to form a flat folded box.

3. A method of forming a box from a blank comprising a box bottom, inner end-wall members at the ends of the bottom, side walls at the sides of the bottom, each having outer-end-wall forming end-extensions one longer than the other; said method comprising conveying the blanks horizontally in a straight path with said inner end-wall-members at the advance and following edges; folding said inner end-wall members on said bottom, and folding the thus folded blank along a longitudinal line to superpose the side walls upon each other, while the blank is still traveling in said path; then moving the blank in a new path at right angles to the first path; folding each longer extension to superpose the free margin of the longer upon the free margin of the shorter extension while moving in the new path; and securing the superposed margins together.

4. A box making method comprising providing a flat blank cut and scored to form a bottom; inner end-wall members extending from the bottom; side walls extending from the respective sides of the bottom; one side wall having short end-extensions, the other having end wall forming extensions; said blank having score extending longitudinally through the bottom and inner end-wall members; and bisecting scores bisecting the outer end-walls from top to bottom; said method further comprising successively feeding said blanks constantly horizontally in a straight path alined with said axial score; successively folding the advance and following innner end-wall members as the blank advances and superposing them upon the top face of said bottom, while holding and guiding the side edges of the blank; holding horizontal the end-wall bearing side wall and adjacent portion of the bottom while folding the thus folded blank along said central score to superpose the fastening extensions upon the corner margins of the outer end walls respectively, and while still maintaining said central score moving in alinement with said path; applying adhesive to the exposed faces of the thus superposed extensions; maintaining the blank horizontal and moving it in a new path transverse to the first path, with the central score transverse to the new path; and then, while the blank is still moving in the new path, folding said end-walls at the bisecting score to superpose and adhere the margins of the end wall to said extensions; thereby to form a flat folded box.

5. In combination, mechanism for conveying in a horizontal plane, a blank comprising a body having a foldable member at the advance edge; a folder-carrier movable with and under said blank; a forward folding dog pivotally mounted at its forward parts to said carrier under said member; and a longitudinal cam bar engageable under the dog to raise said dog thereby to raise said member; said forward dog being of sector shape with the pivot at the apex, and having a rounded upper and lower corner, the dog being so disposed and dimensioned that when the lower corner mounts said cam bar, said rounded upper corner engages under and raises the inner margin of the forward foldable member and holds it inclined upwardly and forwardly.

6. In combination, mechanism for conveying, in a horizontal plane, a blank comprising a body having a foldable member at the following edges; a folder-carrier movable with and under said blank; a following folding dog pivotally mounted at its forward part to said carrier under said folding member and having a lower rounded corner; a longitudinal cam bar engageable under the dog and said corner to raise said dog thereby to raise said member; said rear dog being of approximate sector shape with the apex near the pivot and having the upper rear corner formed with an upwardly and forwardly projecting finger adapted, as the dog mounts the cam bar, to engage the foldable member; said finger being sufficiently forwardly disposed relatively to the lower rounded corner to fold said foldable member almost against the blank.

7. In combination, mechanism for conveying a blank comprising a body having foldable members at the advance and following edges; a folder-carrier movable with said blank; folding dogs movably mounted on said carrier respectively near said members; means to move said dogs against said members to cause the members to assume and maintain an angle to the body; said rear dog folding the rear member to form an acute angle with the body; and a holding means to move the members to the body.

8. In combination, mechanism for conveying in a horizontal plane, a blank comprising a body having foldable members at the advance and following edges; a folder-carrier movable with and under said blank; advance and following folding dogs pivotally mounted at their forward parts to said carrier respectively under said members; a longitudinal cam bar engageable under the dogs to raise said dogs thereby to raise said members; said rear dog having a forwardly movable finger adapted, as the dog rises to fold the rear member forwardly over said body; and a holding bar above the blank to lower the members close to the body.

9. In combination, mechanism for conveying in a horizontal plane, a blank comprising a body having foldable members thereon; a folder-carrying chain movable with and under said blank; lug blocks on said folder-carrying chain disposed, relative to said mechanism, in position to lie substantially under said blank; a longitudinal cam bar; folding dogs pivotally mounted on said blocks respectively, and each having a downwardly and rearwardly inclined lower cam face adapted to be engaged by said rear cammed end, thereby to pivotally move the dogs upwardly and forwardly; means to limit the pivotal movement of the dog; tensioned means to cause the dog to yieldably engage the cam bar and return to lower position when disengaged therefrom; said dog being movable, as the dog rises to fold the member to form an angle with said body; and a holding bar above the blank to lower the members close to the body.

10. In a folding machine, the combination of a pair of parallel conveyor chains having drive lugs for conveying, in a horizontal plane, blanks having foldable members at the advance and following edges; a longitudinal transversely adjustable supporting frame; a grooved bar secured along said frames and provided in its top face with a chain race groove; a folder-carrying chain disposed substantially between said conveyor chains and having its upper course disposed in said race groove, under and near the passing blank; means for driving said chains in a direction away from the feed means substantially at the same speed; a cam bar secured to the outer side face of said grooved bar and extending longitudinally a distance greater than the length of the blank and having a rear cammed end; advance and following folding dogs pivotally mounted at their forward parts on said chain, respectively under said members, and engageable on the bar to raise said dogs thereby to raise said members.

11. In combination, mechanism for conveying a box blank comprising a body having foldable front and rear members, said mechanism including flexible elements; a cam carrier movable with said mechanism and the blank, said carrier including flexible elements which are disposed below the first elements; spaced pivot means mounted on said carrier and adapted to register with said members; front and rear folding dogs pivotally mounted on said means and normally depending therefrom; and a fixed bar disposed in the path of movement of said dogs, so that said bar may engage said dogs and turn the latter upwardly into folding relation with said members.

12. In combination, mechanism for conveying in a blank comprising a body having a foldable member; a folder-carrier movable with and under said blank; a folding dog movably mounted on said carrier under said members; a longitudinal cam bar engageable under the dog thereby to hold said dog and said members raised; an axially transverse roller mounted at the rear end of the cam bar to form an antifriction rear cammed end to engage said dog.

13. In combination, mechanism for conveying in a horizontal plane a blank comprising a body having foldable members at the advance and following edges; a folder-carrier movable with and under said blank; advance and following folding dogs pivotally mounted at their forward parts to said carrier respectively under said members; a longitudinal cam bar engageable under the dogs to raise said dogs thereby to raise said members; said rear dog having a forwardly movable finger adapted, as the dog rises to fold the rear member forwardly over the blank; a fixedly mounted holding bar disposed longitudinally above the path of the blank, offset from and parallel to the path of said dogs, and having a lower engagement face upwardly cammed at the receiving end and adapted to engage and force down the foldable members as the blank passes; means cooperating with said holding bar to receive blanks therefrom with the partially folded members, and flatten the latter against the blank body.

14. In a folding machine, the combination of feed means mounted at the receiving end of the machine for feeding, one at a time to the machine, blanks having foldable members, mechanism for conveying said blanks from the feed means, comprising parallel conveyor chains having horizontal upper courses disposed to receive blanks fed from the feed means; drive lugs on said chains, positioned to engage a rear edge of each blank as it is fed from the feed means, to drive and maintain the blank with its main axis alined with its path of movement; chain race bars mounted under said courses and having upwardly open races to receive the chains; means to move the races and chains toward or from each other to accommodate blanks of different sizes; guide means on the race bars to engage over the side margins of the blanks; and member folding mechanism comprising a folder-carrier movable with said blank; folding-dogs movably mounted on said carrier respectively under said members; and means to raise said dogs thereby to raise said members.

15. In a folding machine, the combination of mechanism for conveying blanks from the feed means, comprising conveyor chains having parallel horizontal upper courses and having drive lugs to engage a rear edge of blanks having advance and following foldable members; a longitudinal grooved bar provided with a chain race groove disposed substantially between said conveyor chains; a folder-carrying chain having its upper course disposed in said race groove; means to drive said chains at the same speed and direction; a cam bar at the side of said grooved bar and having a rear cammed end; advance and following folding dogs pivotally mounted on said folder-carrying chain respectively under said members, and adapted to engage on said cam bar to pivotally move the dogs upwardly; said forward dog being so shaped and disposed that when it mounts said cam bar it raises and holds the advance member inclined upwardly; said rear dog having its upper rear part formed with a forwardly projecting finger adapted, as the dog mounts the cam bar, to engage and fold the rear foldable member almost against the blank; and a holding bar disposed longitudinally above the path of the blank, and adapted to lower the folded members as the blank passes.

16. In combination, mechanism for conveying a blank comprising a body having a foldable member at an edge; a folder-carrier movable with said blank; a one-piece folding dog movably pivotally mounted on said carrier; adjacent to said member; and a non-traveling cam engageable with said dog to move said dog against said member to cause the members to assume an angle to the body.

17. In combination, mechanism for conveying a substantially horizontally disposed blank comprising a body having foldable members at the advance and following edges; a folder-carrier movable with and under said blank; one-piece folding dogs movably pivotally mounted on said carrier on substantially horizontal transverse axis respectively under said members; a horizontal elongated cam bar engageable under said dogs to move said dogs, upwardly against said members to cause the members to assume an angle to the body, and to hold said dogs in raised position; and a stationary longitudinal holding bar above the path of said members to move the members to the body.

18. In combination, mechanism for conveying a box blank comprising a body having a foldable member at an edge thereof; a cam carrier movable with said mechanism and the blank, pivot means mounted on said carrier and including a bearing stem, a one-piece folding dog pivotally mounted on said stem and normally depending therefrom, and a fixed bar disposed in the path of movement of said dog, whereby to raise the latter for folding said member.

19. In combination, mechanism for conveying in a horizontal position a blank comprising a body having a foldable member at a non-lateral edge; a folder-carrier movable with and under said blank; a folding dog pivoted on a transverse axis which is mounted on said carrier under said member; and a non-traveling cam engageable with and under said dog to raise said dog against said member to cause the member to assume an angle to the body, said cam adapted also to hold said dog in moved position to hold said member at said angle.

20. In combination, mechanism for conveying a blank comprising a body having a foldable member at an edge; a folder-carrier movable with said blank; a folding dog pivotally mounted on said carrier adjacent to said member; and a non-traveling cam engageable with said dog to positively move said dog against said member to cause the member to assume an angle to the body, and to positively hold said dog in moved position and to hold said member at said angle.

21. In combination, mechanism for conveying a substantially horizontally disposed blank comprising a body having foldable members at the advance and following edges; a folder-carrier movable with and under said blank; folding dogs movably pivotally mounted on said carrier on substantially transverse axis respectively under said members; means engageable with said dogs to move said dogs upwardly against said members to cause the members to assume an angle to the body and to maintain said dogs in position to hold said members at said angle; and a stationary longitudinal holding bar above the path of said members to move the members downwardly to the body.

22. In combination, mechanism for conveying a substantially horizontally disposed blank comprising a body having a foldable member at an edge; a folder-carrier movable with and under said blank; a folding dog movably pivotally mounted on said carrier under said member; and a non-traveling cam engageable under said dog to positively move said dog upwardly against said member to cause the members to assume an angle to the body and to positively hold said dog in raised position.

23. In combination, mechanism for conveying blanks comprising bodies and having foldable forward and rear inner members, said mechanism including parallel feed chains; drive lugs carried by said chains for engaging the rear edges of the blanks; fixed race bars having top channels for the chains; guide bars mounted on the outer margins of the race bars and having undercut inner portions for engaging the lateral margins of the blanks to hold the latter down; a folder-carrier movable with said chains and the blanks, said carrier being positioned between the chains and below the level thereof; folding dogs movably mounted on said carrier and adapted for alignment with said members; and means for moving said dogs upwardly against said members whereby to cause the latter to assume positions angular to the bodies.

24. In combination, mechanism for conveying blanks comprising bodies having foldable forward and rear inner members; said mechanisms including parallel chains having drive lugs positioned to engage the rear outer edges of the blanks; race bars having top channels to receive the chains; a folder-carrier movable with said chains in a path between and below the race bars; guide means for said blanks; folding dogs movably mounted on said carriers directly below said members; and means for moving said dogs upwardly against said members, whereby to cause said members to assume positions angular to said bodies.

25. In combination, mechanism for conveying in a substantially horizontal plane a blank comprising a body having a foldable member at an edge; a folder-carrier movable with said blank; a one-piece folding dog pivoted to said carrier under said member; and a longitudinal cam bar engageable with the dog to raise said dog thereby to raise said member; said dog having an upwardly projecting finger, the dog being so disposed and dimensioned that when the dog mounts said cam bar, said finger engages under and raises the forward foldable member and disposes the member and itself over said body.

26. In combination, mechanism for conveying in a substantially horizontal plane a blank comprising a body having a foldable member at a non-lateral edge; a folder-carrier movable with and under said blank; a folding dog pivoted under said member to said carrier on a transverse axis; and a cam bar engageable under the dog to raise said dog thereby to raise said member; said dog having a lower corner and an upwardly projecting finger, the dog being so disposed and dimensioned that when the corner mounts said cam bar, said finger engages under and raises the foldable member and disposes itself and the member over said body.

27. In combination, mechanism for conveying in a substantially horizontal plane a blank comprising a body having a foldable member at the rear edge; a folder-carrier movable with and under said blank; a folding dog pivoted to said carrier under said member; and a non-traveling bar engageable under the dog to raise said dog thereby to raise said member; said dog having a lower corner and a forwardly projecting finger, the dog being so disposed and dimensioned that when the lower corner mounts said bar, said finger engages under and raises the foldable member.

28. In combination, mechanism for conveying in a substantially horizontal plane a blank comprising a body having a foldable member at the advance edge; a folder-carrier movable with and under said blank; a forward folding dog pivotally connected at its forward parts to said carrier under said member; and a longitudinal cam bar engageable under the dog to raise said dog thereby to raise said member; said forward dog being so disposed and dimensioned that when the dog mounts said cam bar, said upper part of the dog engages under and raises the forward foldable member.

29. In combination, mechanism for conveying a box blank comprising a body having foldable front and rear members; an endless cam carrier movable with said mechanism and having a linearly disposed portion; said mechanism including an endless conveyor which has a portion disposed parallel with the first portion and above the latter; spaced pivot means mounted on said carrier and including elements which are disposed directly below said members, a folding cam pivotally mounted on each of said elements and normally depending therefrom, and a fixed bar disposed in the path of movement of said cams, said bar being parallel with said portions, so that said bar may engage said cams whereby to turn the latter upwardly into folding engagement with said members.

30. In combination, mechanism for conveying a box blank comprising a body having foldable front and rear members; and endless cam carrier movable with said mechanism and having a linearly disposed portion; said mechanism including endless conveyor chains which have portions disposed parallel with the first portion and above the latter; spaced pivot means mounted on said carrier and including elements which are disposed directly below said members, a folding cam pivotally mounted on each of said elements and normally depending therefrom, and a fixed bar disposed in the path of said cams and having an inclined end, said bar being parallel with said portions, so that said end may engage said cams whereby to turn the latter upwardly into folding relation with said members, said cams being adapted to travel frictionally along said bar.

THEODORE VON THIEN.